United States Patent Office 3,696,028
Patented Oct. 3, 1972

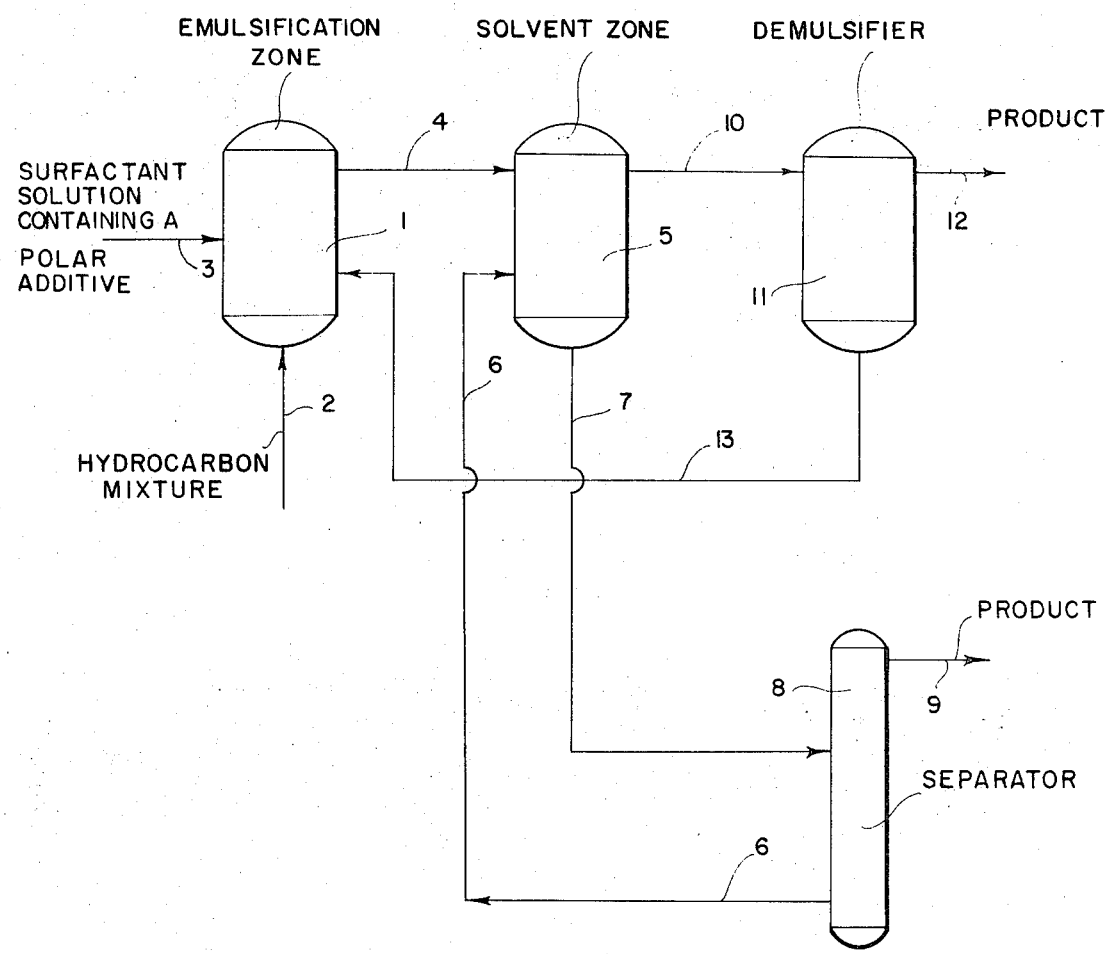

3,696,028
LIQUID MEMBRANE SEPARATION PROCESS
Norman N. Li, 158 Oakwood Ave., Edison, N.J. 08817, and Robert B. Long, 249 E. Highland Ave., Atlantic Highlands, N.J. 07716
Continuation-in-part of application Ser. No. 791,586, Jan. 16, 1969. This application Aug. 24, 1970, Ser. No. 66,549
Int. Cl. C10g 21/10; B01j 17/34
U.S. Cl. 208—308                 11 Claims

ABSTRACT OF THE DISCLOSURE

A process for separating components of a hydrocarbon mixture by selective permeation through a liquid surfactant membrane containing a polar additive.

---

This application is a continuation-in-part of application Ser. No. 791,586, filed Jan. 16, 1969, now abandoned.

This invention relates to a hydrocarbon separation process. More particularly, this invention relates to an improved method for the separation of hydrocarbon mixtures by selective permeation through a liquid surfactant membrane containing a polar additive.

The separation of hydrocarbon mixtures in which the components have similar physical and/or chemical properties has long posed difficult problems to those skilled in the art. For example, different hydrocarbon components, while having different structures, may still have identical boiling points and the same number of carbon atoms. Such mixtures are often difficult, if not impossible, to separate by conventional techniques, such as distillation, solvent extraction, or the like. Further, such conventional separation techniques require the use of extensive equipment such as a large number of plates in the distillation process or large tanks for the required settling step in a conventional liquid solvent separation process.

Prior art processes, therefore, have not proven entirely satisfactory, not only because they are expensive to operate and maintain but often the separations achieved are not as would be desired.

In U.S. Pat. No. 3,389,078 to E. R. Elzinga and N. N. Li, there is described a process for the separation of hydrocarbons having similar physical and/or chemical properties that substantially overcomes many of the difficulties found in the prior art conventional separation techniques. In this patented process, separation of difficult hydrocarbon mixtures is achieved by first coating drops of the hydrocarbon mixture with an aqueous solution of a water-soluble surfactant to form a liquid membrane around the outer surface of the drops, and then contacting the coated drops with a solvent for the mixture. In the solvent phase, the liquid membrane permits selective permeation of one or more of the mixture's components and serves as a physical barrier preventing direct contact of the mixture with the solvent.

Thus, the more permeable component or components of the mixture pass through the liquid membrane and into the solvent and the less permeable component remains within the drops. Residence time in the solvent is controlled to achieve maximum separation and then the solvent phase is separated from the aqueous phase and the separated components are recovered.

A problem encountered, however, in such a process is the tendency of the liquid membrane to break up or rupture in the solvent phase. Rupture of the membrane, of course, destroys the physical barrier set up by the membrane and allows the entire hydrocarbon mixture to pass into the solvent. Thus, while the use of liquid surfactant membranes has proven advantageous for the separation of difficult hydrocarbon mixtures and represents a significant improvement over prior art techniques, the process is still faced with some difficulties due primarily to the low separation yields obtained.

In U.S. Pat. No. 3,410,794 to N. N. Li, there is described an improvement for the above liquid membrane separation process in which the drops of the hydrocarbon mixture are fomed by emulsifying them in a solution of the surfactant. Emulsification reduces drop size and increases the total surface area of the drops in contact with the solvent, resulting in an increase in the permeation rate and overall selectivity or separation yield of the more permeable component. Drop break-up in the solvent phase, however, continues to plague the process an suppresses yields that might othewise be obtainable.

In accordance with the present invention, it has been found that membrane rupture can be substantially eliminated by including within the surfactant membrane a polar additive. It is believed that the polar additive acts to increase the membrane strength by complexing with the surfactant. A polar additive is defined as a molecule, in which the center of its negative charge does not coincide with the center of its positive charge. Polarity of a molecule can result from polar bonds such as double or triple bonds, e.g. ethylene or acetylene unsaturation, or from functional groups, such as hydroxyl, aldehyde, keto, carboxyl, cyano, nitro, sulfo, sulfonyl ether and amino. Additives which are classified as polar within the above definition are within the scope of this invention. The polar additive is preferably water soluble and should also increase the viscosity of the liquid membrane since increased viscosity necessarily results in increased membrane strength. It should be noted that the polar additives do not strengthen the liquid membrane primarily by increasing membrane viscosity. Glycerol, the most preferred polar additive, for example, increases the liquid membrane viscosity only slightly, yet greatly increase the liquid membrane strength. While the use of the polar additive reduces somewhat the rate of permeation of the more permeable component, the reduction is more than offset by the increase achieved in overall selectivity.

In accordance with a preferred embodiment of this invention, a water-soluble, polar additive is added to an aqueous solution of the surfactant, and an emulsion of the hydrocarbon mixture is formed in the solution to obtain relatively small drops of the hydrocarbon mixture coated with the strengthened, liquid surfactant membrane of this invention.

The accompanying drawing, which is incorporated in and constitutes a part of the specification, illustrates a preferred embodiment of the invention and together with the description serves to explain the principles of this invention.

The drawing is a schematic diagram of the process of this invention for separating hydrocarbon mixtures.

It is to be understood that both the foregoing general description and the following detailed description are exemplary and explanatory but are not restrictive of the invention.

The process of the present invention is applicable to the separation of a wide variety of hydrocarbon mixtures including, for example, the separation of aromatics from normal or isoparaffins, such as benzene or toluene from normal or isohexane; cycloparaffins from normal or isoparaffins, such as cyclohexane from normal or isoheptane; olefins or diolefins from paraffins, such as hexene or 1,4-hexadiene from hexane and; di-olefins from olefins, such as 1,3-butadiene from isobutene.

Further separations that can be achieved by the process of this invention include the separation of aromatics from virgin naphtha, the separation of petroleum fractions for recovering aromatics, hydrocarbon isomers, or for improving the octane number of gasoline boiling-range fractions and the separation of azeotropes and close-boiling mixtures of water and oxygenated hydrocarbons, such as alcohols, ketones, ethers, aldehydes, and acids. Mixtures of three or more of such hydrocarbon components can, of course, also be treated in accordance with this invention.

In accordance with the invention, hydrocarbon mixtures, the components of which may have similar physical and/or chemical properties, are separated by selective permeation through liquid membranes formed from surfactant molecules.

A wide variety of different surfactants may be used in the process of the present invention. Various surfactants include anionic, cationic, and nonionic surfactants; as well as miscellaneous surfactants, such as polymeric and fluorocarbon surfactants. While all of the above surfactants may be utilized in the process of the present invention, ionic surfactants are preferred because they ionize in solution and are capable of separating hydrocarbons based on the difference in molecular polarity. Normal paraffins may be separated from olefins, for example, in this manner since the unsaturation of the olefin makes it more polar and thus it tends to diffuse through the surfactant membrane more readily than the paraffin. All the surfactants, however, are used in aqueous solution and therefore must be water-soluble.

Anionic surfactants include a wide range of compounds. Perhaps the best known of which are the soaps which are water-soluble salts of long-chain carboxylic acids. The soaps usually contain 12 to 18 carbon atoms per molecule and may be prepared from saturated or unsaturated fatty acids. Generally, the soaps are salts of sodium, potassium or ammonia.

Included among the soaps are the aliphatic sulfonates which are represented by the general formula: $R.SO_2O^-$, $Na+$ in which R can be a straight-chain or branched-chain paraffin, or a cycloaliphatic radical. Exemplary of this group is sodium tetradecane sulfonate.

Additionally, the group includes sulfonates of aliphatic-aromatic hydrocarbons such as alkylated naphthalene, alkylated benzene, and aralkyl aromatics. When utilizing benzene as the aromatic constituent of the surface active agent, it has been found that best results can be achieved if one of the alkyl groups is $C_{10}$ to $C_{14}$ in length.

Other surface-active agents included in this general group are ester sulfonates such as sulfoester and sulfoacyl compounds, amide sulfonates such as sulfoamide and sulfoacyl amide compounds and sulfoamide sulfonates. Additionally, sulfonates containing ether, amino, keto and sulfone groups may be utilized.

The anionic surface-active agents also include aliphatic sulfates which are characterized by the generic formula $R(OSO_3^-, Na+)_n$ wherein R contains one or more hydrophobic groups and $n$ is at least one. R may be a saturated or unsaturated aliphatic group, branched or with a straight chain usually containing 12 carbon atoms. Exemplary of this group is sodium dodecyl sulfate.

The group also includes sulfated fatty alcohols such as straight-chain, secondary, tertiary and branched-chain fatty alcohol sulfates. Additionally, sulfated fatty condensation products, sulfated fatty glycerides, acids and esters as well as sulfonated oils may be used.

Also included in the group of anionic surfactants is saponin, a plant glucoside that foams in water forming a colloidal solution.

The general group of cationic surfactants includes amine salts as well as quaternary ammonium compounds. Salts of long-chain primary alkyl amines including octadecylamine and dodecylamine are effective surfactants in this group. The secondary and tertiary amine salts and quaternary ammonium salts are preferred. Amine salts having at least one $C_8$ to $C_{20}$ alkyl group are effective surfactants.

Preferred surfactants for use in the process of this invention are saponin and sodium dodecyl sulfate.

In accordance with the invention, an aqueous solution of any one or a mixture of the above surfactants is formed containing about 0.001 to 10% by weight and preferably about 0.2% by weight of the surfactant. A mixture of hydrocarbons to be separated is then formed into drops and the drops are coated with a layer of the surfactant solution.

A number of methods may be used for forming the coated drops, for example by bubbling the hydrocarbon mixture through the surfactant solution. Alternatively, and as more fully described in U.S. Pat. No. 3,410,794, the hydrocarbon mixture is emulsified by mixing it in an aqueous solution for about one to five minutes at speeds of 300 r.p.m. or higher and the emulsified mixture is then passed through the surfactant solution. Preferably, however, the hydrocarbon mixture is emulsified in the aqueous surfactant solution.

By emulsifying the hydrocarbon mixture, relatively small drops having a diameter of from about $1 \times 10^{-6}$ to $1 \times 10^{-2}$ cm. are obtained that are coated on the outer surfaces with a liquid membrane of the surfactant solution. Emulsification can be accomplished in any of several ways, such as high speed stirrers, colloid mills, valve homogenizers, ultrasonic generators, or mixing jets.

In accordance with the process of this invention, a polar additive is included in the aqueous surfactant solution before the hydrocarbon mixture is coated with the solution. It has been found that such additives greatly strengthen the surfactant membrane resulting in substantial elimination of drop breakup in the solvent phase and a marked increase in overall selectivity or separation yields. In many instances, as more fully shown in the accompanying examples, drop life and separation factors are increased by more than 25 fold over the values heretofore obtained without the use of the polar additives of this invention.

A wide variety of polar additives can be used in the process of this invention. Exemplary of water-soluble additives are proteins, such as collagen; colloids, such as starch; macromolecules, such as polyethylene glycol; naturally occurring vegetable gums as gum arabic, guar gum, agar-agar, and carrageenan; synthetic polymers, such as carboxymethylcellulose; and polar water-soluble compounds, such as ethylene glycol and glycerol.

The polar additives of this invention are added to the aqueous surfactant solution in an amount of at least 0.2% by weight, based on the total weight of the solution. Higher amounts of the additive achieve longer drop life and higher separation yields, but their beneficial results are coupled with a decrease in the permeation rate. Hence the amount of additive used is based on an economic factor depending on how pure a separation or how fact a separation is desired.

It has been found, however, that about 90% by weight of the additive represents about the maximum amount that should be used both because the solutions become too viscous to handle above this level and because further increases in the amount of the additive achieve no useful purpose. Concentrations of from about 1 to 90% by weight are advantageously employed, preferably around 70% by weight.

The surfactant membrane coated drops of the hydrocarbon mixture, containing the strengthening additive of this invention are then passed into contact with a solvent for the hydrocarbons in the drops. Because of the selectivity of the surfactant membrane to the mixture of hydrocarbons, the more permeable component or components of the mixture permeate through the membrane and pass into the solvent. The solvent thus becomes rich in the more permeable component, while the concentration of the less permeable component increases within the drop.

The solvent is selected so that all members of the mixture are miscible in it. Selective miscibility of the solvent with the more permeable component of the mixture enhances separation, hence the selective solvent for the desirable permeable compounds can also be used to enhance the overall separation.

Solvents that may be used in the process of this invention are organic in nature, and include the paraffins and aromatics, such as hexane, decane, p-xylene, undecane, dodecane, toluene, n-pentane, kerosene, and solvent 100 neutral, which is a heavy paraffin oil. To enhance subsequent separation of the permeates from the solvents as discussed in more detail below, the preferred solvents for use in the process of this invention have boiling points remote from that of the permeates.

Contact time with the solvent varies for different hydrocarbon mixtures. The maximum separation yield or the highest concentration of the more permeable component in the solvent phase usually occurs at about 20–40 minutes contact, after which the yield begins to decline. This decline is illustrated in Examples 12 and 13 and is believed to be caused by the concentration gradient between the more permeable component in the feed and that in the solvent.

The length of time, however, before the concentration gradient becomes high enough to effect separation yields is long, generally 20 to 40 minutes. Thus, required residence time of the coated drops in the solvent before the yields decline can easily be determined and controlled.

After the prescribed solvent-contact time, the solvent containing the more permeable hydrocarbon component or components is separated from the drops now containing a higher concentration of the less permeable component or components of the hydrocarbon mixture.

Following this separation, the solvent is distilled or otherwise treated to recover the permeate and the aqueous surfactant emulsion is broken to recover the non-permeate. The distilled permeate is condensed and taken out as product and the solvent is recycled for reuse in the separation process. Breaking of the non-permeate emulsion can be accomplished in a suitable de-emulsification unit where the hydrocarbons and the surfactants having different densities separate out into distinct layers. The top layer, usually the hydrocarbons, is taken out as product or recycled for further processing. The bottom layer, usually the broken aqueous surfactant solution, is recycled for reuse in the separation process.

Multi-stages can also be used to achieve additional enrichment of the separated components. In such a multi-stage process, after an initial separation of the permeate from the solvent phase, the permeate is recycled back to the emulsion zone to be once again contacted with liquid surfactant and thereby forms a new emulsion. In like manner, after the emulsion is broken, the non-permeate is recycled back to another emulsion zone and treated again. Such multi-stage and recycle processes can be used to produce substantially pure components.

The temperature at which the hydrocarbon mixture is separated has little effect on either the degree or rate of separation of the mixture. It is generaly only necessary to prevent freezing or boiling of the various elements used in the process and maintain them as liquids so that mass transfer can occur. Ambient temperatures, therefore, i.e., 20 to 30° C., can be used in the process of this invention.

Pressure is also not critical and need only be sufficient to maintain all the ingredients, i.e., the surfactant, solvent, and hydrocarbon mixtures in the liquid phase. Ambient pressures, therefore, i.e., one atmosphere can be used in the process of this invention.

The entire process can best be illustrated with reference to the accompanying drawing. A hydrocarbon mixture containing two components of similar physical and/or chemical properties such as n-heptane and toluene, is introduced into emulsification zone 1 through line 2. An aqueous solution containing 0.2% saponin (for example) as a surfactant and 70% glycerol (for example) as the polar additive is introduced into emulsification zone 1 through line 3 and an emulsion is formed by mixing the surfactant solution with the hydrocarbon mixture at speeds of around 300 r.p.m. or higher. The drops of hydrocarbon mixture formed in the emulsification zone are thus coated with a liquid membrane of the surfactant solution and have a diameter of approximately 0.01 cm.

Following emulsification the coated drops are passed through line 4 into a solvent zone 5, where they are contacted with a solvent, for example, kerosene. In solvent zone 5 the more permeable component, which in this case is toluene, permeates through the membrane and into the solvent and the less permeable component, n-heptane, remains in the drops. Agitation may be used in the solvent zone to ensure complete contact of the drops with the solvent, but generally is restricted to low speeds of around 10 to 100 r.p.m. to prevent unnecessary break-up of the drops.

After the required contact time, depending on the rate of permeation and the degree of separation desired, generally around 20–40 minutes, the solvent is passed through line 7 into a separator 8 to separate it from the more permeable component. Separator 8 may be a distillation column in which case the more permeable component, toluene, passes out through product line 9 and the solvent is recycled through line 6 to solvent zone 5 for reuse.

Simultaneously, the emulsion is passed through line 10 to a demulsifier 11 where the less permeable component, n-heptane, is separated from the surfactant solution. Demulsifier 11 may be an electrostatic precipitator or any other well known device for breaking emulsions. After the emulsion is broken, the aqueous surfactant solution readily separates from the less permeable component and the latter is removed from line 12 as product, while the surfactant solution is recycled through line 13 to emulsification zone 1.

For a clearer understanding of this invention, specific examples of it are set forth below. The "separation factor" shown in the following examples is a measure of the separation yield obtained and is defined by the ratio of the concentration of the more permeable component(s) to the less permeable component(s) in the solvent to the concentration of the more permeable component(s) to the less permeable component(s) in the feed. For example, the separation factor of toluene in normal heptane is as follows:

$$\left(\frac{\text{Toluene}}{\text{n-heptane}}\right) \text{solvent} \Big/ \left(\frac{\text{Toluene}}{\text{n-heptane}}\right) \text{feed}$$

Hence, the higher the separation factor, the greater the separation between the components in the hydrocarbon mixture. The examples are merely illustrative and are not intended to limit the scope and underlying principles of the invention in any way.

EXAMPLE 1

This example illustrates the increase in drop life or membrane stability achieved by the process of this invention.

In this example, a single drop of hydrocarbon mixture consisting of toluene and heptane in a 1:1 weight ratio is sent into a separation unit containing a aqueous solutio consisting of 0.2% saponin by weight, and varying amounts of a polar additive as set forth in Table I below. Included in this example is a control solution that contains surfactant only.

After contacting with the aqueous surfactant solution, the liquid surfactant membrane coated drop of the hydrocarbon mixture is contacted with hexane as the solvent. Drop life is measured as the interval of time between the feed drop solvent contact and the breakdown of the drop in the solvent medium. Operating temperatures and pressures are ambient.

The approximate results of the drop life determinations are set forth in Table I below:

TABLE I

| Polar additive (percent by weight of solution) | Life in feed drop (min.) |
|---|---|
| 0.0% | 10 |
| Polyethylene glycol (30%) | 20 |
| Glycerol (30%) | 194 |
| Glycerol (70%) | >200 |

To determine the viscosity increasing effect of the polar additive, as realted to the strength of the liquid membrane, the viscosity of a 0.2%, by weight, solution of saponin in water was measured with various levels of either polyethylene glycol or glycerol added. As shown in the table below, the viscosity of the polyethylene glycol solution was much higher than the glycerol solution at all levels, thus demonstrating that the viscosity increasing function is not the only factor which increases membrane strength. It is believed that glycerol is extremely effective because the functional polar groups make up 55% by weight of the total molecular weight of the molecule.

After emulsification, the emulsion is fed to a vessel containing 115 grams of toluene as a solvent, where the emulsified hydrocarbon drops are gently washed with a solvent.

Samples of the solvent are taken periodically from initial solvent/emulsion contact and analyzed for their concentrations of the more permeable components, i.e., benzene and cyclohexane. Contact time is continued beyond the point of maximum separation. The maximum separation factors achieved in each sample are set forth in Table II below.

TABLE II

| Percent glycerol in surfactant solution | Separation factor | |
|---|---|---|
| | Benzene | Cyclohexane |
| 0.0 | 2.9 | 1.2 |
| 30.0 | 3.6 | 1.2 |
| 70.0 | 95.0 | 2.7 |

EXAMPLES 3–8

The procedure of Example 2 is repeated in each of these examples with various hydrocarbon mixtures, surfactants,

TABLE III

| Example No. | Hydrocarbon mixture (weight ratio) | Surfactant (percent) | Percent of glycerol in surfactant solution | Separation factor | |
|---|---|---|---|---|---|
| | | | | Benzene | Toluene |
| 3 | Hexane, benzene and toluene (1:1.06:1.11) | Saponin (0.2%) | 0.0 | 3.7 | 2.9 |
| | | | 30.0 | 5.8 | 4.6 |
| | | | 70.0 | 14.3 | 8.5 |
| 4 | Hexane, benzene and toluene (1:1.13:1.16) | Dodecyl sodium sulfate (0.2%) | 0.0 | 4.4 | 2.6 |
| | | | 30.0 | 5.3 | 2.5 |
| | | | 70.0 | 13.4 | 7.7 |
| 5 | Isohexane (2,4 dimethyl butane); isoheptane (2,4 dimethyl pentane); benzene; and toluene (1:1.1:1.2) | Saponin (0.2%) | ¹0.0 | 6.7 | 4.7 |
| | | | ¹30.0 | 8.4 | 5.0 |
| | | | 70.0 | 60.0 | 32.1 |
| 6 | Isohexane (2,4 dimethyl butane); isoheptane (2,4 dimethyl pentane); benzene; and toluene (1:1.07:1.11) | Dodecyl sodium sulfate (0.2%) | 0.0 | 8.4 | 5.4 |
| | | | 30.0 | 7.0 | 3.9 |
| | | | 70.0 | 28.8 | 15.0 |
| | | | | Hexene | 1,4-hexadiene |
| 7 | Hexane, hexene, and 1,4-hexadiene (1:1.45:1.42) | Saponin (0.2%) | ²0.0 | 1.5 | 2.0 |
| | | | ²70.0 | 2.0 | 4.0 |
| | | | | Aromatics | |
| 8 | Virgin naphtha aromatics/paraffins | do | 0.0 | 1.1 | |
| | | | 70.0 | 17.2 | |

¹ Solvent is undecane.
² Solvent is n-pentane.

TABLE Ia.—VISCOSITY OF SOLUTIONS OF VARIOUS POLAR ADDITIVES IN WATER

All solutions contain 0.2% saponin as surfactant

| Wt. percent polar additive in water solution | Viscosity at 100° F. in centistokes | |
|---|---|---|
| | Glycerol | Polyethylene glycol |
| 10 | 0.8595 | 7.098 |
| 30 | 1.021 | 114.1 |
| 50 | 1.465 | 1,081.8 |
| 70 | 8.91 | |
| 90 | 58.77 | |

EXAMPLE 2

Three (3) 35 gram hydrocarbon samples consisting of mixtures of benzene, cyclohexane and hexane in a weight ratio of 1 to 1.25 to 1.46, are each fed to an emulsifier of the type shown in FIG. 1. One (1) sample is emulsified with 75 grams of an aqueous solution consisting of 0.2% saponin, 69.8% water, and 30% glycerol; and a second sample with 75 grams of an aqueous solution consisting of 0.2% saponin, 29.8% water, and 70% glycerol. The final sample is used as a control and is emulsified with 75 grams of aqueous solution containing only 0.2% saponin.

Operating temperatures and pressure are ambient. The hydrocarbon mixtures and surfactant solutions are emulsified by rapid stirring at 300 r.p.m., resulting in small drops of the hydrocarbon mixtures, coated with the saponin membrane.

and varying percentages of a polar additive as set forth in Table III above.

Samples of the solvent were taken at various intervals from initial solvent/emulsion contact and the maximum separation factors obtained are shown in Table III. The solvent used in each of these examples is decane unless otherwise noted.

EXAMPLE 9

The procedure of Example 2 is repeated using varying amounts of glycol in place of glycerol as the polar additive. The results achieved in this example are comparable to those obtained in Example 2.

EXAMPLE 10

The procedure of Example 2 is repeated with varying amounts of polyethylene glycol in place of glycerol as the polar additive. The results achieved in this example indicate that polyethylene glycol increases the liquid membrane strength, but not quite to the same extent as equal weights of glycerol.

EXAMPLE 11

The procedure of Example 2 is repeated with varying amounts of carboxymethylcellulose in place of glycerol as the polar additive. The results achieved in this example indicate that carboxymethylcellulose increase the liquid membrane strength, but not quite to the same extent as equal weights of glycerol.

EXAMPLE 12

This example demonstrates the maximizing of the separation factor with time after initial solvent/emulsion contact.

The procedure of Example 2 is repeated in this example with a mixture of hydrocarbon feed consisting of hexane, benzene, and toluene in a weight ratio of 1:1.13:1.16, respectively. The aqueous surfactant solution contains 0.2% dodecyl sodium sulfate and 70% glycerol by weight. The solvent is decane.

Samples of the solvent are taken at various times ($\Delta t$) from initial solvent/emulsion contact, and the separation factors determined from each of these samples are set forth in Table IV below.

TABLE IV

| $\Delta t$ (min.) | Separation factor | |
|---|---|---|
| | Benzene | Toluene |
| ½ | 4.5 | 1.7 |
| 1 | 8.0 | 3.4 |
| 6 | 7.8 | 3.6 |
| 9 | 8.7 | 5.0 |
| 12 | 9.1 | 4.6 |
| 15 | 11.0 | 5.7 |
| 18 | 11.6 | 6.2 |
| 21 | 11.4 | 6.4 |
| 24 | 13.4 | 7.7 |
| 27 | 11.7 | 6.6 |
| 30 | 11.2 | 6.5 |
| 33 | 11.9 | 7.0 |
| 36 | 11.8 | 7.3 |
| 39 | 9.5 | 5.7 |
| 42 | 9.2 | 6.0 |
| 124 | 3.8 | 3.4 |

EXAMPLE 13

The procedure of Example 12 is repeated in this example, with the exception that the emulsified hydrocarbon drops are agitated in the solvent by stirring at about 60 r.p.m. The temperature of the solvent in this example is −20° C. The hydrocarbon feed consists of hexane, benzene and toluene in a weight ratio of 1 to 1.2 to 1.17.

Separation factors determined from samples taken at various times $\Delta t$ from initial solvent/emulsion contact are set forth in Table V below.

TABLE V

| $\Delta t$ (min.) | Separation factor | |
|---|---|---|
| | Benzene | Toluene |
| ½ | 7.8 | 1.6 |
| 2 | 10.0 | 2.6 |
| 4 | 9.2 | 2.8 |
| 8 | 8.1 | 3.0 |
| 13 | 5.2 | 2.2 |
| 17 | 3.7 | 2.1 |
| 22 | 2.6 | 1.2 |
| 27 | 2.3 | 1.5 |
| 32 | 2.0 | 1.4 |
| 37 | 1.6 | 1.3 |
| 42 | 1.6 | 1.3 |
| 47 | 1.6 | 1.3 |
| 52 | 1.7 | 1.3 |
| 57 | 1.8 | 1.3 |

The invention in its broader aspects is not limited to the specific details shown and described, and departures may be made from such details within the spirit and scope of the accompanying claims without departing from the principles of the invention and without sacrificing its chief advantages.

What is claimed is:

1. A process for separating components of a hydrocarbon mixture which comprises:
   (a) forming drops of the hydrocarbon mixture;
   (b) coating the drops with an aqueous solution containing a surfactant and about 0.2 to 90 weight percent of a polar additive selected from the group consisting of proteins, starches, polyethylene glycol, gum arabic, guar gum, agar-agar, carrageenan, carboxymethylcellulose, ethylene glycol and glycerol to form a liquid surfactant membrane around the outer surface of the drops, said membrane permitting selective permeation of at least one component of the mixture more rapidly than at least one other component; and
   (c) contacting said membrane coated drops with a solvent for said mixture, whereby at least a portion of the more permeable component passes through said membrane and into said solvent and at least a portion of the less permeable component remains within the drops.

2. The process of claim 1, wherein the hydrocarbon mixture is emulsified in the aqueous solution to form the coated drops.

3. The process of claim 1, including the step of:
   (d) separating the drops from the solvent and recovering the more permeable component from the solvent and the less permeable component from the drops.

4. The process of claim 1, wherein the polar additive is selected from the group consisting of glycerol, glycol, and polyethylene glycol.

5. The process of claim 4, wherein the polar additive is glycerol.

6. The process of claim 1, wherein the surfactant is an ionic surfactant.

7. The process of claim 1, wherein the surfactant is an anionic surfactant selected from the group consisting of saponin and a sodium alkyl sulfate.

8. The process of claim 1, wherein the surfactant comprises from about 0.001 to 10% by weight of the aqueous solution.

9. The process of claim 1, wherein the components of the hydrocarbon mixture are n-paraffins or isoparaffins as the less permeable components and cycloparaffins, aromatic hydrocarbons, olefins or diolefins as the more permeable components.

10. The process of claim 1, wherein the hydrocarbon mixture consists of paraffins and aromatics and the aqueous solution contains 0.2% saponin as the surfactant, 70% glycerol as the polar additive, and the balance water.

11. The process of claim 1, wherein the polar additive is water soluble.

References Cited

UNITED STATES PATENTS

| | | | |
|---|---|---|---|
| 3,389,078 | 6/1968 | Elzinga et al. | 208—308 |
| 1,520,953 | 12/1924 | Johansen | 208—308 |
| 3,410,794 | 11/1968 | Li | 208—308 |
| 2,603,599 | 7/1952 | Trautman | 252—358 |

HERBERT LEVINE, Primary Examiner

U.S. Cl. X.R.

210—23